2 Sheets—Sheet 1.
J. F. KETTELL.
STATION INDICATORS AND SPEED RECORDERS
No. 179,200. Patented June 27, 1876.
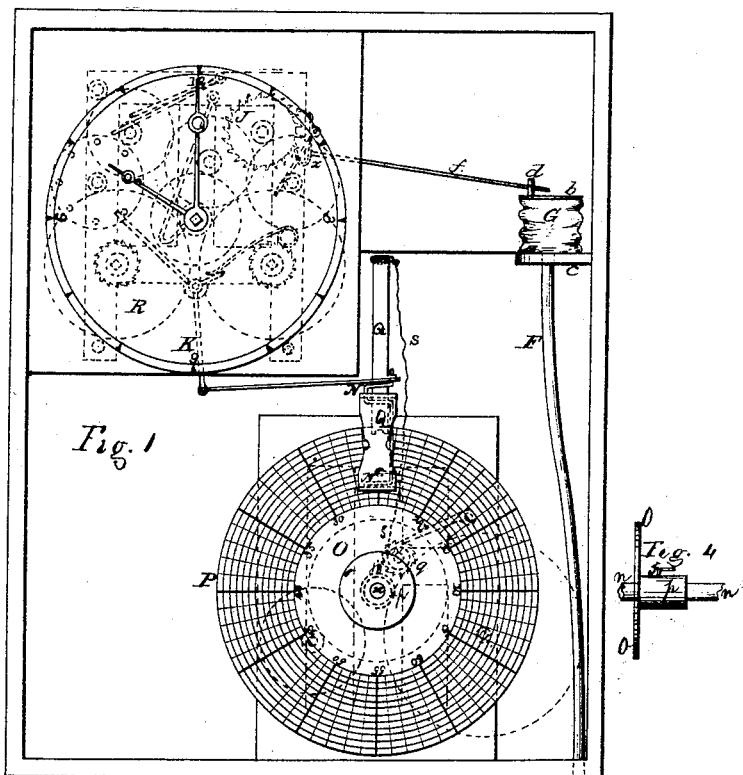
Fig. 1
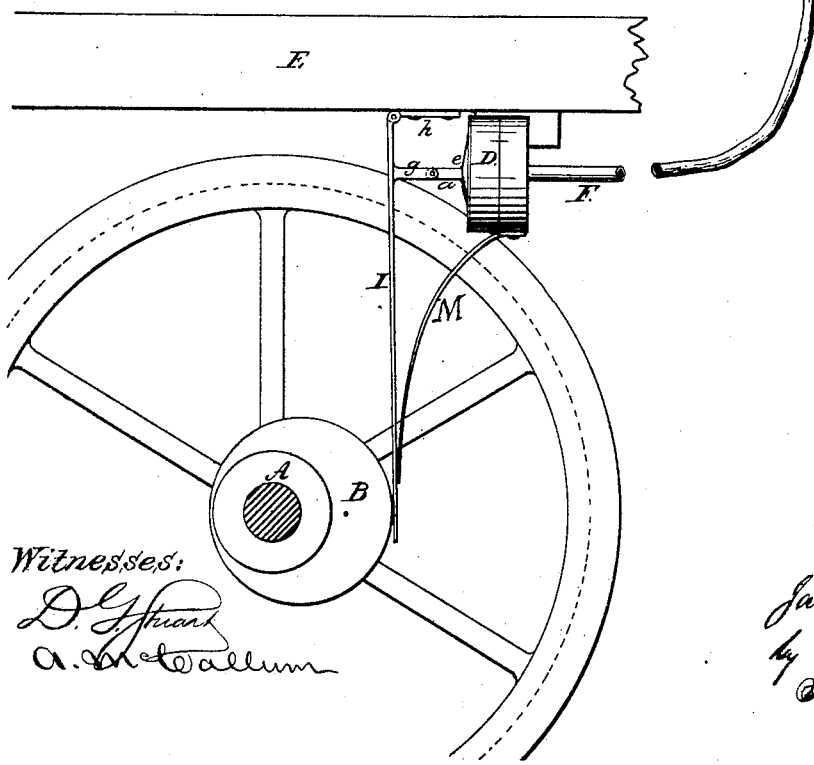
Witnesses:
Inventor:
James F. Kettell 2 Sheets—Sheet 2.

J. F. KETTELL.
STATION INDICATORS AND SPEED RECORDERS

No. 179,200. Patented June 27, 1876.

Witnesses.
L. Van Riswick.
D. G. Stuart

Inventor:
James F. Kettell
by P. Hannay
atty.

UNITED STATES PATENT OFFICE.

JAMES F. KETTELL, OF WORCESTER, MASSACHUSETTS.

IMPROVEMENT IN STATION-INDICATORS AND SPEED-RECORDERS.

Specification forming part of Letters Patent No. 179,200, dated June 27, 1876; application filed December 23, 1875.

*To all whom it may concern:*

Be it known that I, JAMES F. KETTELL, of Worcester, in the county of Worcester and State of Massachusetts, have invented certain new and useful Improvements in Station-Indicator and Speed-Register; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 2:
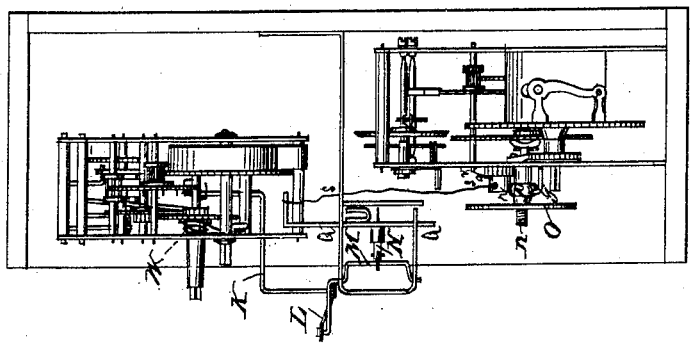
Figure 3:
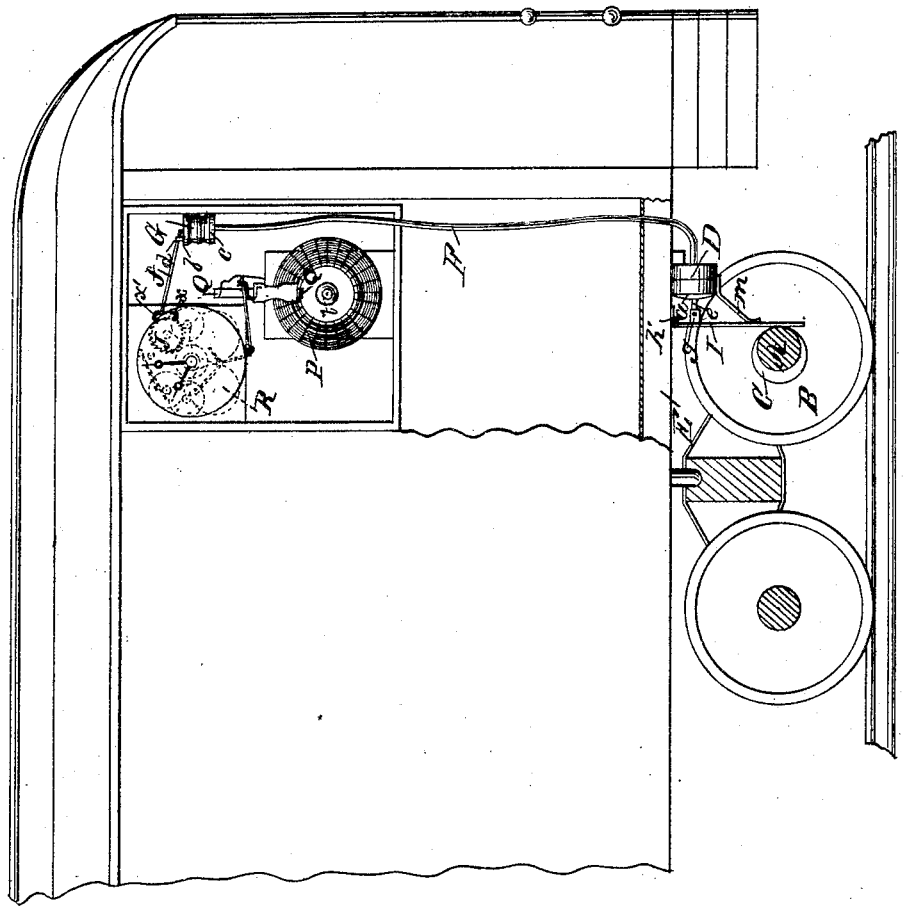

Figure 1 represents an elevation of an apparatus to which my improvements have been applied, the mechanism being indicated by dotted lines in skeleton outlines; and Fig. 2 a side elevation of the time-register and distance-recorder, as combined. Fig. 3 represents a mode of applying my improved device to a car; and Fig. 4, a detail view.

My invention relates, first, to a new mode of operating the escapement-wheel of the distance-register and station-indicator; and secondly, to a new mode of combining a speed-register with the distance-register, whereby not only the distance traveled and the relative speed with which each portion of that distance has been traveled, but also the length of time of each stoppage of the car, may all be indicated with exactness and certainty; and whereby each station may also be indicated at the proper time.

The invention consists, first, in effecting the record of each revolution of the car-wheel through the instrumentality of a column of air or water or other suitable gaseous or liquid body, the automatic compression of which is so utilized as to release the verge of the escapement-wheel and allow the latter to move one tooth for every revolution of the car-wheel, thus affording a simple and efficacious method of recording each and every revolution; secondly, it consists in a new method of recording these revolutions upon a time-register through the instrumentality of the mechanism which registers the distance traveled—*i. e.*, through the number of revolutions the car-wheels have made.

To enable others skilled in the art to make, construct, and use my improvement, I will now proceed to describe its parts in detail.

In the drawing, A represents the axle of a car-wheel; B, the car-wheel (in dotted lines), and C, an eccentric or cam-wheel firmly keyed to the axle. To the bottom of the car, represented by the beam E, is secured a hollow cylinder, D, having a flexible diaphragm, *a*, securely attached to it at one end, by an air and water tight joint, and at the other a communicating tube or hose-pipe, F, which passing through the bottom of the car, extends up the inner side of the end of the car to the box containing the registering devices, as shown in Fig. 3. To the upper end of tube F is secured a flexible or elastic vessel, G, made perfectly air and water tight, thereby establishing communication between the two chambers D and G through pipe F. The top *b* and bottom *c* of chamber G are made of some rigid material, such as wood or metal, but preferably of sheet metal. On the top *b* is arranged a vertically-slotted stud, *d*, into the slot of which rests the outer end of the verge-arm *f*. If desired, a removable pin may be passed transversely through stud *d*, to confine the arm *f* of the verge H; but such is not absolutely necessary where a deep notch or slot is made in stud *d*. The flexible diaphragm *a* of cylinder D is provided at or near its center with a short piston-rod, *e*, formed on, or otherwise secured to, a rigid disk, which in turn is secured to the diaphragm *a* in any suitable and known manner, such as is used in diaphragm-pistons to make their union air and water tight.

Piston-rod *e* at its outer end is connected to a lever, I, through an arm, *g*, by means of a hinged joint, the end of arm *g* being slotted for that purpose, to receive the end of rod *e*, a pin being then passed through both; or the slot may be formed on rod *e*.

Lever I is secured to the bottom of the car by means of a hinged plate, *h*, thus leaving its other end free to be moved back and forth, as occasion requires.

By reference to Fig. 1 it will be seen that lever I is made to bear at its free end upon the cam B on the car-axle A, it being held firmly there by the traction of a spiral spring, *m*, the one end of which is secured to the bottom of the car and the other to the lever I. Or, what is preferred, this may be effected by the action of a bent spring, also marked *m*, and shown in dotted lines in Fig. 1, the one end of which is secured to the cylinder D and the other made to bear against the face of lever I.

The parts being thus arranged and connected together, it will be apparent that each time the axle revolves the cam B will, through lever I, arm g, and rod e, force the diaphragm-piston a into the cylinder D, and thereby expel whatever of air or water is therein contained into pipe F and thence into vessel G, filling and expanding the latter, raising its top b, and with it stud d and outer end of verge-arm f, and, in so doing, release the lower detent x of the verge H, allowing the escapement-wheel J to make a partial revolution until arrested by the upper detent x' of the verge. Now, as the eccentric part of the cam B passes from contact with the lever I, the spring m draws or forces lever I back against the cam, and, in so doing, drags the diaphragm a back from within cylinder D, thus allowing the air or water to descend and fill that chamber, thereby causing vessel G to collapse, carrying with it the outer end of verge-arm f, or, otherwise, allowing it to descend by atmospheric compression, thus giving a final release to one tooth of the escapement-wheel; and so on, one tooth for every revolution of the car-wheel.

The escapement-wheel J is combined with a train of gears and other mechanism incident to a clock having an hour and minute hand, and which strikes an alarm for each and every hour as they elapse, and which, being well understood, is, therefore, here unnecessary to be described, it only differing in this, that, instead of striking twelve or eight times to denote these hours, it is made to strike but one blow, as it were, each time the striking-lever has been released, in order to impart to a lever or rod, L, connected with a crank-arm or lever, (instead of a hammer,) a single forward and backward thrust, and thereby communicate an oscillating motion to a double crank-shaft, M, the other crank-arm of which carries a plunger, N, in the end of which is arranged a pencil, pricker, or needle, h, which, on every downward thrust, is made to mark or perforate a rotating paper dial, P, moved by clock-work in proper time, in the same manner as a minute-hand, and which rotating dial is divided into sixty radial spaces to denote the minutes, and into any required number of circular spaces, concentric with the index-carrying barrel or shaft of the clock, to indicate the hours, the latter or circular lines being used, in connection with a sliding index-finger, Q, to indicate the number of hours that has elapsed since the first starting of the cars. The concentric rings are consecutively numbered 1 2 3 4, &c., from the outer line inward.

On the shaft n (which in clocks carries the minute-hand) is keyed fast a disk, o, by means of a sleeve, p, on its inner face. This sleeve carries an arm or tooth-pin, j, which is made to engage with the teeth of a ratchet-wheel, q, mounted on a stud at the side of the index-spindle n. On the side of this ratchet q is cast a barrel, r, to which is secured one end of a cord, s, the other end of which is attached to the upper end of the hour slide-index Q.

Thus arranged, each revolution of the dial or index spindle n through the pin j on the sleeve of disk o causes the ratchet-wheel to move for the distance of a tooth, and with the latter the barrel r, causing the latter to wind the cord s a corresponding distance, thereby depressing the hour slide-index Q—in other words advancing it from one circular line on the dial P to the next inner one, thereby denoting the fact that another hour has begun, of running time.

Slide-indicator Q carries a small friction-spring, to retain it in place when moved or adjusted. The paper dial P is placed centrally on shaft n, and is then, after being properly adjusted, firmly clamped to disk o by a covering-screw disk or plate, t.

The ratchet-wheel q, when moved a tooth, is held firmly in place by a pawl, v. By raising pawl v the cord may be unwound from the barrel of the ratchet, and the sliding index Q adjusted to commence anew at the beginning of each trip, or whenever desired. This done, and the pawl reset, the machine is again ready for work, to which end the disk Q may be turned back until its pin j rests against the tooth of the ratchet q, and the movable paper dial P to zero—i. e., the radial line marked 60, arranged centrally opposite the concavity in the end of the slide-index Q.

The dial-plate R on the distance-recording mechanism, unlike the recording dial-plate P of the speed-indicating mechanism, is made to remain stationary, for which purpose it may be secured to the frame of the mechanism or to the box, in any suitable manner.

The barrel and shaft which in the ordinary clock carries the hour and minute hands, in this case does the same, and in the same manner—the minute-hand performing a whole revolution for each mile traveled, and the hour-hand indicating the number of miles traveled. For this purpose the escapement-wheel and gearing intermediate between it and the so-called minute and hour hands, are suitably constructed with respect to the size and number of teeth on each, in a way well known to clock-makers, so as to effect these results. Moreover, these gears can be so multiplied with relation to the so-called hour-hand or barrel, as that it shall only perform a complete revolution for each trip made. In the drawing it is represented as being applied to an index-dial, where the distance traveled is but twelve miles long.

Instead of having but one ring of index-numbers it may be provided with two, one for the mile-hand, so divided as to indicate a mile by a full revolution, and that subdivided into any convenient part of a mile, to facilitate the computation of speed, while the other circle would be divided into the full number of miles contained in the trip or round trip; and on this latter circle could be printed, at the proper distances apart, as indicated by the number of miles on the dial, the names of the different stations at which the cars stop, and thus indicate by that hand or index the station at which they have stopped, the same dial thus constituting a station-indicator, as well as distance-recorder.

In operating the speed-register the release mechanism of the arm K, that imparts motion to the plunger N that carries the needle or pencil which pricks or marks the rotating dial P, is so combined as to effect this object at any required number of revolutions of the car-wheel—as, for instance, once for every fifty, one hundred, or two hundred revolutions, according as deemed most advisable; and the mechanism is so contrived as that a spring will so act on the arm K, which produces the thrust, that, as soon as made, arm K will be instantly forced back again to its normal position, thereby, through its connecting-rod L and double crank M, instantly withdrawing the needle or pricker from the dial, thus leaving it free to turn continuously with the spindle $n$ of the clock-work, on which it is mounted in lieu of the minute-hand. Thus the number of pricks made in any minute, or series of consecutive minutes, as indicated by the dial P, will give, by computation, the relative speed of the train at any given time during the trip. Moreover, the absence of pricks for any given time will also indicate the length of time consumed in making any one or all of the stops.

Having described my invention, what I claim as new, and desire to secure by Letters Patent, is—

1. The combination of the axle A of a car or other vehicle, cam B, lever I, spring $m$, piston or diaphragm $a$, and compressing-vessel D, with tube F, expanding-vessel G, verge $f$, and escapement-wheel J, of a train of gears operating a station-indicator constructed substantially as set forth.

2. The combination of the actuating lever K, arranged to operate substantially as set forth, rod L, and double crank M, with a pencil, needle, or pricker, and a revolving dial, P, traveling at a uniform rate of speed, as and for the purposes described.

3. The combination of the dial P and its carrying-disk $o$ and pin $j$ with the ratchet $q$, with cord or chain $s$, pawl $v$, and slide-index Q, substantially as and for the purpose set forth.

In testimony that I claim the foregoing as my own I affix my signature in presence of two witnesses.

JAMES F. KETTELL.

Witnesses:
SAML. B. WHEELER,
FRANK C. BIRNBAUM.